Patented Mar. 29, 1927.

1,622,474

UNITED STATES PATENT OFFICE.

KARL SVEEN, OF AAS LANDBRUKSHOISKOLE, NORWAY.

PROCESS OF EFFECTING AGGLOMERATION IN PAPER PULP AND OTHER SUSPENSIONS AND MIXTURES.

No Drawing. Application filed July 17, 1925, Serial No. 44,355, and in Norway July 21, 1924.

This invention has for its object a process of effecting agglomerations of solids applicable in the manufacture of paper.

In the manufacture of paper according to this process an improved agglomeration of the constituents of the paper pulp is effected by the addition of certain active substances in small proportions to the pulp. By use of the present process it is possible to produce paper containing a much larger percentage of fillers and also to obtain a better retention of fillers than according to hitherto known methods. The process also allows of obtaining an improved recovery of mineral substances for example fillers and also of fibrous materials from waste liquids of various character.

An important characteristic feature of the invention consists in incorporating auxiliary substances into the paper pulp in such a manner and at such a point of time that the substances even in very small proportions together with the mordants of the pulp will aid with a prominent effect to hold the fillers and other constituents of the pulp in the paper.

The auxiliary substances which are made use of according to the invention will usually consist of solutions of substances which together with the mordants can exert a strongly agglomerating action. Such substances are for example solutions of animal glue such as gelatine, joiners' glue, glue from leather waste, fish glue as well as albuminous substances such as casein and further also various soap solutions and rubber milk.

The mentioned auxiliary substances when used in accordance with the invention will even in very small proportions produce an effect which to a prominent degree exceeds that obtained by adding the substances in the manner hitherto employed that is in the hollanders.

According to the invention substances of the character above referred to are given a prominent power of effecting and promoting agglomeration of filter particles for example kaolin reciprocally as well as with the fibrous material when the materials in question beforehand have been treated sufficiently with mordant for example aluminium sulphate and are still in contact therewith. I have discovered that the binding (agglomerating action) has the greatest power immediately after or during a short period of time after the incorporation of the auxiliary substance.

When this property has been imparted to the paper pulp in such a manner that it is in possession of its power during the passage of the pulp on to the wire cloth of the paper machine it will act in an excellent manner to hold within the paper the suspended particles which would otherwise be carried away in the escaping water, as strained, sucked or pressed off.

According to the invention this action can be brought up to a high effect by introducing the auxiliary substance in a dilute solution into the diluted and previously mordanted paper pulp shortly or immediately before the pulp is supplied to the wire. When this measure is made use of very small quantities of the active substance can be used to bring about a very strong effect.

It is of importance that the active substance is rapidly distributed into the diluted pulp and that it enters into a suitably short lasting contact herewith during quiet and uniform motion before the pulp flows on to the wire cloth.

Subsequent violent motions, rubbing, long-lasting, standing and dilutions will on the other hand diminish and disturb the desired effect.

The treatment naturally will be carried into effect as a continual after-treatment of the paper pulp, which may have been subjected to various treatments such as grinding, filling, sizing, mordanting and colouring as desired provided that sufficient mordant has been employed.

The continual treatment should, as I have found take place in the flowing pulp, during or after its final dilution, for example in the mixer (where back-water, "or white" water is added) or in the later flow through the sand trap and knot-strainer or in the inlet before the wire.

It may also be suitable to use a special supply and mixing vessel, inserted at a suitable point before the wire.

It has been found that a particularly good effect can be attained by the use of animal glue as an aggregation-promoting substance, and it has also been found, that the valuable properties of a recently produced solution thereof can be further highly improved by storing of the solution some time at ordinary or lowered temperature for example during a period of some few days.

This increase is due to changes taking place in the character of the solution, the rapidity of these changes being dependent also upon the temperature, amongst other things.

It has also been found that in several instances it will be of advantage besides the animal glue to use additional substances which have a precipitating effect upon the animal glue for example lignine substances such as waste "sulphite liquor" (from the manufacture of cellulose according to the sulphite method) as it is or after some preparatory treatment. Precipitation products in a dissolved form prepared beforehand can also be used.

The treatment of paper pulp with aggregation promoting substances as above explained can also be utilized to effect improved sizing of the paper.

A treatment in accordance with the invention as above described in connection with the manufacture of paper can also be made use of to recover mineral substances and in connection herewith also of fiber material in dilute aqueous suspensions thereof such as various waste liquors ("save all" water) obtained in the course of the production of cellulose and paper, in that an aggregation effect, which can be produced by the substances mentioned above in connection with a previously added mordant, can be utilized to accelerate and complete settling of suspended substances. The aqueous suspension for example "save all" water with its content of mineral matter such as kaolin and mordant such as aluminium sulphate is then supplied with such substances and is supplied during uniform and quiet agitation in a suitable short-lasting period of time, with aggregation promoting material in dilute solution whereupon the suspension which has been so treated, for example, in a continuous flow, is passed into a suitable apparatus for settling.

In water from the paper machine, which has been treated according to the invention an improved deposition of retained finely suspended matter will as such be a consequence of the treatment to which the paper pulp has been subjected according to the invention.

As illustrations of the effects which can be attained by the application of the present invention some figures will in the following be given representing results of experiments made in part on a laboratory scale and in part on a manufacturing scale on the paper machine.

The paper pulp employed consisted of bleached sulphite cellulose, loaded with china clay for printing paper quality.

Comparison samples were taken under equal conditions: samples A without auxiliary (active) substance and samples B with additions according to the invention. The figures are the ash contents in the respective paper samples given as grams of ash to each 100 grams of paper free from water.

*Laboratory experiments.*

*Example I.*—Auxiliary substance: gelatine in a quantity of 0,1 g. to each 100 g. of fillers:

A—17,82—18,13
B—31,1

*Example II.*—Auxiliary substance: joiners' glue-sulphite-liquor-preparation:

A—12,4
B—21,8

*Example III.*—Auxiliary substance: Rubber emulsion. (Liquid rubber latex)

A: 17,82—Ink resistance: bad.
B: 28,0—Ink resistance: good.

*Manufacturing experiments:*

*Example IV.*—Auxiliary substances: joiners' glue in a quantity of about 0.65 kg. to each ton of paper.

A—16,7
B—25,9

*Example V.*—Auxiliary substances: As in Example II about 1 kg. to each ton of paper.

A—about 16,9%
B—about 26,2%

Claims:

1. Process of producing paper comprising the steps of incorporating into dilute paper pulp containing a mordant and being in the condition ready to be passed on to the wire cloth of the paper machine, a small proportion of an auxiliary substance of such a character as to become contracted or coagulated by interaction with mordants.

2. Process according to claim 1 in which a liquid containing the auxiliary substance is mixed with the flowing pulp on its last stage of dilution before it is passed on to the wire cloth of a paper machine.

3. Process according to claim 1, in which a liquid containing the said auxiliary substance is added to the pulp during gentle agitation in a separate vessel.

4. Process according to claim 1, in which a solution of an auxiliary substance comprising gelatine is incorporated into the dilute pulp whereupon the pulp is passed on to the wire.

5. Process of promoting agglomeration of particles of matter suspended in liquids which comprise the steps of dissolving a substance comprising gelatine in an aqueous liquid aging the solution by storing it some time, incorporating a proportion of the resulting aged solution into the liquid containing suspended matter to be agglomerated and separating the agglomerated matter from the liquid.

6. Process of promoting agglomeration of particles suspended in an aqueous liquid comprising the step of incorporating a small proportion of dissolved gelatinous substance into the liquid containing fibrous solid particles in dilute suspension as well as a substance able to effect coagulation of colloids leaving the liquid comparatively quiet for a short period of time and thereupon separating the agglomerated matter from the liquid.

7. The process which comprises the step of incorporating into a liquid containing suspended solid particles as well as a substance of such a character as to effect coagulation of colloids, a small proportion of aged animal glue and separating the liquid from the solids hereby agglomerated.

8. Process of promoting agglomeration of particles suspended in an aqueous liquid comprising the step of incorporating a small proportion of dissolved gelatinous substance and a lignine derivate into the liquid containing particles in dilute suspension as well as a substance able to effect coagulation of colloids.

In testimony that I claim the foregoing as my invention, I have signed my name.

KARL SVEEN.